US00RE39036E

(19) United States
(12) Reissued Patent
Castleman

(10) Patent Number: US RE39,036 E
(45) Date of Reissued Patent: Mar. 28, 2006

(54) UNIVERSAL POWER-SUPPLY CONNECTION SYSTEM FOR MULTIPLE ELECTRONIC DEVICES, AND DEVICES FOR USE THEREWITH

(75) Inventor: Neal J. Castleman, Malibu, CA (US)

(73) Assignee: Ergo Mechanical Systems, Incorporated, Santa Monica, CA (US)

(21) Appl. No.: 10/132,742

(22) Filed: Apr. 24, 2002

Related U.S. Patent Documents

Reissue of:
(64) Patent No.: 6,054,846
Issued: Apr. 25, 2000
Appl. No.: 08/739,460
Filed: Oct. 29, 1996

U.S. Applications:
(63) Continuation-in-part of application No. 08/198,994, filed on Feb. 18, 1994, now Pat. No. 5,570,002.

(51) Int. Cl.
*G05F 1/56* (2006.01)

(52) U.S. Cl. ..... 323/283; 307/31
(58) Field of Classification Search ..... 323/234, 323/283, 285, 322; 307/11, 31, 33
See application file for complete search history.

(56) References Cited

U.S. PATENT DOCUMENTS 4,804,916 A * 2/1989 Frank ..... 323/300
5,391,976 A * 2/1995 Farrington et al. ..... 323/207
5,818,673 A * 10/1998 Matsumaru et al. ..... 361/63

* cited by examiner

*Primary Examiner*—Adolf Berhane
(74) *Attorney, Agent, or Firm*—Peter I. Lippman

(57) ABSTRACT

The system provides electricity to operate any of a multiplicity of device and most typically receives power from a source and passes power to any of the devices. The system also accepts electronic-device identification information for any particular one of such devices. The system also has one or more programmed digital electronic microprocessors that use the identification information to select power parameters—for passage of power from the source to the powered device. The system activates its own power-passing capability to apply power to each device according to the power parameters selected by the microprocessor. A cable, which for some purposes may regarded as part of the system and for some purposes is a separate invention, connects the microprocessor and power-passing parts of the system to the powered device; the identification information is held either in the cable—typically in a ROM, PROM, EPROM or other memory chip in one of the end connectors of the cable—or in the device to be powered, or in a power adapter which is at either end of the cable or within the device to be powered, and is read by the system microprocessor before power is supplied. In some forms of the invention, a power adapter preferably receives a. c. power from the system and derives, from the a. c. power, power in a modified form for operation of the device.

70 Claims, 7 Drawing Sheets

UNIVERSAL POWER-SUPPLY CONNECTION SYSTEM FOR MULTIPLE ELECTRONIC DEVICES, AND DEVICES FOR USE THEREWITH

Matter enclosed in heavy brackets [ ] appears in the original patent but forms no part of this reissue specification; matter printed in italics indicates the additions made by reissue.

RELATED PATENT DOCUMENTS

This is a continuation-in-part of my patent application Ser. No. 08/198,994, filed Feb. 18, 1994, and now issued on Oct. 29, 1996, as U.S. Pat. No. 5,570,002.

BACKGROUND OF THE INVENTION

This invention relates generally to supplying electrical is power to electronic and other electrical devices; and more particularly to systems and apparatus for providing electrical power to operate any of a multiplicity of such devices.

Although a general introduction appears below, it will be helpful to readers who are already familiar with my above-identified patent to known at the outset that this present document deals not only with the invention as set forth and/or claimed in that patent, but also with certain special cases of the invention. In these special cases: (1) a power adapter is used as part of, or instead of, the special power cable of my earlier invention—and the adapter per se may be at either end of the cable; (2) identifying information for an electronic device is passed from, or through, a power adapter to a power-supply system, rather than through a cable as such; (3) identifying information is held in a memory unit within a power adapter, rather than in a cable; and (4) some forms of the invention as claimed are, or include, an electronic device (rather than a cable) that holds a memory unit for identifying the device to a power-supply system. To an extent these several special cases may arise either independently or in various combinations.

In many situations it is desirable to make general provision for supplying electrical power to a device that will be provided later, as for instance by a customer or other user of a multiuser facility. By "multi-user facility" I mean to encompass a facility used by just a small number of people at a time, or even one person at a time—but in which the people or person using the facility at any time are typically different from the people or person using it at other times—and in any event the individual device cannot be specified or identified in advance.

Mobile facilities, which is to say vehicles—such as ships, airplanes, trains, buses and automobiles are examples of such multiuser facilities. Continuing in the same vein, stationary facilities of interest for present purposes include transportation terminals such as airport lounges.

Other pertinent types of multiuser facilities include hotels, restaurants, convention and exhibit halls, schools, laboratories and offices. Problems related to supply of electrical power in all such multiuser facilities will now be discussed.

As will shortly appear, however, it is possible to analyze and generalize the problems under discussion. Such generalization will lead to realization that related problems, such as economic inefficiencies, are present even in single-user circumstances.

In a mobile facility and elsewhere far from the user's own home or office it can be particularly important to supply electrical power exclusively in correct form for the device which will use that power, and furthermore exclusively to devices which are suitable for operation in the particular facility. For instance, supplying power in an incorrect form (for instance incorrect voltage) may damage the device to which the power is supplied, and such damage may be especially problematic for a user who is in transit—when repair or replacement may be unfeasible.

In a mobile facility, supplying power in an incorrect form may also cause problems more intimately related to the power-supplying equipment—by damaging that equipment, or taking it temporarily out of service. Such equipment may be particularly limited in current-carrying capacity or in ability to accept loads or signals reflected from the electrical device back into the supply.

Here too, repair or replacement of a mobile power supply en route may be unfeasible on account of the limitations inherent in travel. Similarly some candidate solutions such as fuses and circuit breakers within vehicles pose their own inherent undesirable costs and inconveniences.

Even more importantly, some electrical and particularly electronic devices interfere with safe operation of nearby equipment such as a vehicle in which such devices are used. A classical and well-known example of this problem is computer-generated interference with air navigation.

Thus for some situations it may be desirable to entirely deny, rather than supply, power for particular individual devices. To put it another way, it may be desirable to entirely deny power for any device that is not approved for use.

To facilitate generality of expression in this document, however, denying power will be encompassed within the concept of selecting power parameters for the particular combination of electrical device and facility—and then applying power "according to the power parameters". In other words, for purposes of this document it is to be understood that selected parameters in some cases may be "no voltage and no current".

Two modern developments make the problems outlined above particularly important. First is a proliferation of portable electronic devices which are nominally internal-battery operated, but which can operate from external power, and whose batteries require replacement or recharging at intervals considerably shorter than the uninterrupted duration of modern travel (as for transcontinental air flights)—and whose direct-external-power and charger-external-power requirements are extremely variegated.

Even for short-range travel, use of external power when available is usually preferable to conserve batteries for environments lacking external power. Such portable electrical devices range from ordinary audio cassette players and handheld electronic games, through portable television sets and video cameras, to full-capability personal computers, FAX machines and even computer printers.

Nominal power requirements of all these devices are extremely diverse as to current drain, voltage, direct vs. alternating waveform, and in the latter case frequency. Furthermore whereas some devices tolerate large departures from nominal values, others accommodate only rather tight tolerances in power characteristics.

Accompanying a great many of these devices, moreover, are rechargers for the internal batteries. In most cases the input-power specifications for the chargers are entirely different from the direct-use external power specifications.

A second pertinent modern development is that some airplane-manufacturer interest has arisen in providing at each passenger seat, or for instance at each business or first-class passenger seat, an equipment pod that includes certain special amenities. Such amenities may for example include a separately deployable video monitor, and in particular a courtesy electrical-connector receptacle for supplying electrical power to laptop computers, dictating machines and the like.

Analogously in vehicles (such as ordinary buses) where navigational interference is not a problem, power receptacles for cellular telephones will be appropriate. More generally it may be desirable, in aircraft as well as other facilities, to power through such receptacles any of the great range of portable electronics mentioned above.

In order to make use of such a power-supply receptacle, each electronic device (computer, telephone, tape recorder etc.) must have a cable terminated compatibly with the receptacle. Such a compatible termination or adapter is readily provided, but—by giving all devices in common an equal access to the facility power supply—only makes more severe the more-fundamental device-compatibility problems discussed earlier.

As will be understood, provision of such amenities at each seat in each aircraft in an entire new aircraft-model line aggravates in a time-immediate way the problems discussed above. This particularly focused need, however, is magnified by the general desirability of solving these problems for other types of vehicles and facilities.

Once attention is directed to the special problems of providing power in multiuser facilities, it can be appreciated that the broad diversity of electronic-device power requirements has itself created a very uneconomic variegation in commercially available separate power-supply modules. This diversity of power-supply units in turn has been fed by various factors, probably including for small-portable-device manufacturers the desirability of (a) supplying a single model for use in various countries with divergent house-voltage specifications, and (b) avoiding submission of their products to the expensive and demanding sort of safety tests generally required for house-voltage apparatus.

A large number of different power-supply modules on the market introduces a significant element of added costs. Such costs are embedded throughout manufacturing, warehousing, inventorying, shipping, and related paperwork for all the related products.

Some manufacturers have attempted to reduce the maze of power-supply modules which travelers need, by providing custom battery-charger/power-supply input units, that operate on any voltage from about 100 through 250 Vac, and at 50 or 60 Hz. Some such units may automatically test the voltage and frequency available, and modify their own power-input characteristics accordingly.

Devices which are so equipped accordingly require only a socket adapter when transported abroad, and thus solve a major problem of diversity as between countries. As will be understood, however, this type of enhancement does nothing to reduce the uneconomic diversity of power-supply specifications or modules within any country, as between different electronic devices.

In a hitherto unrelated field, it is known to provide and employ an integrated-circuit memory unit, such as a ROM, RAM, PROM or EPROM chip, for identification purposes. Modern semiconductor technology makes possible the provision of electronic "keys" or identification units that can each carry one of an essentially unlimited number of electronic key codes.

If desired, each code can be made unique, or substantially so. On the other hand, if preferred a large number of chips can be made with the same code—for use in distinguishing associated people or items from one another by categories.

For example, the DS 2400, 2401 and 2502 circuit devices manufactured by Dallas Semiconductors, Inc., of Dallas, Tex., each have a numerical capacity equal to the fourteenth power of ten, or one hundred trillion, and can be manufactured in such a way that no two of them hold the same number. Thus the numerical range of ROMs and PROMs now on the market exceeds the earth's population by several orders of magnitude.

The above-mentioned Dallas Semiconductors devices are called by the firm its "Touch Memory" chips, as the devices are able to read or write with momentary contact. The firm houses each chip in a stainless steel container which the firm calls a "MicroCan". This coin-shaped container is 16.3 mm in diameter and 3.2/5.8 mm in height.

It is mounted it with one flat circular face of the can secured to the flat surface of a generally rectangular thin flat ID card or a thin flat generally oblong-shaped key fob. A user holds and manipulates the card or fob so as to insert the "MicroCan" into—for example—a generally forwardly facing electronic-lock receptacle, through which data in the chip are read into electronic circuitry within the lock.

The Dallas chips, housed as just described, are advertised for use in identifying a great variety of different things and entities such as people, livestock, or warehoused merchandise; for instance it is now advertised as useful for identifying different kinds of batteries in an inventory. As mentioned earlier, it has not been suggested heretofore that such ROM, PROM etc. chips might have any application to solving the multiple-power-supply problems discussed previously.

As can now be seen, the prior art has failed to provide solutions to important problems in the portable-electronics field.

SUMMARY OF THE DISCLOSURE

The invention corrects the failings of the prior art. Before offering a relatively rigorous discussion of the invention, some informal orientation will be provided here.

It is to be understood that these first comments are not intended as a statement of the invention. They are simply in the nature of insights that will be helpful in recognizing the underlying character of the prior-art problems discussed above (such insights are considered to be a part of the inventive contribution associated with the invention)—or in comprehending the underlying principles upon which the invention is based.

Through modern electronics it is possible to provide a single electronic apparatus capable of supply electrical power at any of a great number of different power specifications that is to say, voltage, impedance, current range, and waveform. It is also possible to control that apparatus to provide power selectively at some particular power specification.

Furthermore, the control can be made automatic—based upon information about the device which is to use the supplied power. Such information, in general principle, can take either of two broad forms: (1) a statement of the power specifications and (2) identification of the device to be powered, from which identification the power specifications can be found by reference to a suitable tabulation linking the identification and specification for a great many different devices.

Still further the information about each device can be encoded in a memory chip and provided to the power-supply apparatus whenever that device respectively is connected to receive power from the supply apparatus. In other words each device can be caused to have an associated respective memory chip which provides the needed identification.

The part of such a power-supply apparatus that accepts and analyzes information from the individual-device memory chips, and controls the power supplied to the powered device, can nowadays be made very small and inexpensive. Similarly, the identifying memory chip associated with each powered device can be very small and inexpensive.

The physical arrangements for association of a memory chip with each powered device are subject to considerable variation. For new devices, preferably the chip may be built into the device; for already-existing devices the chip may be built into a new power cable (preferably into one of the connectors at the two ends of the cable) for each device.

As will be seen, such a cable may be completely passive except of course for the readable information-carrying chip. This may be a maximally economical approach, as to the cable itself; however, as will be seen later a power cable that includes or is associated with a power adapter may turn out at least in certain environments—to be maximally economical overall.

Of course, the costs of these elements cannot be zero, but through their use a single power supply—what might be called a "universal" power supply—can be used for virtually any portable apparatus, thereby introducing a major economy in terms of manufacturing and distribution for power supplies, as suggested previously. A more important economy, however, is that a single power-supply apparatus, provided in and preferably built into a multiuser facility, can be used to supply the portable-electronics needs of essentially any user who appears in the multiuser facility.

This latter economy can be enjoyed particularly in mobile facilities such as airplanes where space and weight allowances for such functions are stringently limited—and where power misapplication can bear severe consequences as pointed out in the preceding section of this document. Not only can each approved device be supplied with electrical power according to its own proper power specifications, but in addition each device can be screened to determine whether it is in fact an approved device for use in the environment of each facility respectively—and, if not, the power specifications for that combination of device and facility can be established, as suggested earlier, to be "no power".

It will be understood that from time to time there may be introduced new portable devices whose power specifications are not adequately compatible with categories previously held in the evaluative circuitry or tabulation that is embedded in the power-supply apparatus. Updating of the evaluative tabulation of circuitry may then become necessary of desirable, and may be facilitated by making that part of the apparatus either (1) a plug-in or otherwise easily replaceable module, or (2) reprogrammable, as for example through the power port.

If desired such versatility can be limited to only more-expensive models actually intended for use in multiuser facilities. Some multiuser versions of the apparatus, those intended for plural and especially multiple concurrent use of power by plural or multiple devices, may also be made to take advantage of economies possibly available through sharing of a central or common evaluation/tabulation module for the facility; in addition to manufacturing economy it will be understood that economy can be realized in the updating procedure by replacing or reprogramming only the central module.

The present document focuses in part on power adapters, rather than completely passive cables as in my above-mentioned patent and in the foregoing paragraphs, because analysis indicates that, in many environments which are extremely important commercially, a system using adapters (most typically carried by the end-user, with the electronic device to be powered) can be far more economical than a system which supplies power directly in a form that can be used in most portable electronic devices. This is particularly true, for instance, in commercial passenger aircraft, where it is very adverse to add weight and other complications required for provision of d. c. power.

To the extent that a system actually calls for wiring of d. c. power over any significant distance within an aircraft, a significant adverse factor is the wiring weight required to avoid undesirable voltage drops and heat dissipation. Further such power must be supplied in various voltages, for use in passengers' telephones, laptop computers, dictating equipment and the like; the requirement of providing voltage in so many different forms is thus undertaken by the common system, even though each single user only uses just one voltage at any given time—and even though many voltages may be used only very occasionally.

In short, although it has been stated above that multi-voltage systems are possible, and in a sense even practical—and are within the scope of certain aspects of my invention and corresponding ones of the appended claims—in at least certain environments such systems are not economically optimum. Systems according to the now-introduced aspects of my invention, to the contrary, are economically optimum in such environments; these systems provide power to operate devices at least one of which has an associated power adapter.

The adapter can receive a standard a. c. voltage from a system receptacle and perform the necessary transformation. Thus the requirement to provide the particular needed voltage can be absorbed by the end user (i.e., the party which wishes to use some particular obscure voltage requirement), and the system need merely check the adapter to determine whether it and its associated electronic device are compatible with the supply system.

Here "compatible" may only mean, for example, acceptable in terms of (1) total power required and (2) electromagnetic emissions. It should be recognized that the adapter, too, has some weight; however, the individual carrying a portable electronic device ordinarily carries an adapter with the device anyway. Therefore with the power-adapter systems according to my invention there is little or no net added weight.

Now with these preliminary observations in mind this discussion will proceed to a perhaps more-formal summary. The invention has several independent main aspects of facets, independently usable although for optimum enjoyment of their benefits they are best practiced together.

Of these main facets of the invention, the first three were presented in my above-mentioned patent, and are repeated below.

In preferred embodiments of a first one of these major aspects, the invention is a power-supply connection system for providing electrical power, from a source of electrical power, to operate any of a multiplicity of electronic devices. The system includes some means for receiving electrical power from such a source; for purposes of generality and breadth in expression of the invention these means will be called simply the "power-receiving means".

In addition the system includes some means for passing electrical power to any of such electronic devices. Again for breadth and generally these will be called the "power-passing means".

The system also includes some means for accepting electronic-device identification information from any particular one of such electronic devices. These means, which will herein be designated the "information-accepting means", are associated with the power-passing means.

Further the system includes some means for using the identification information to select power parameters, for passage of power from the power-receiving means and through the power-passing means to the particular one device. These means include a programmed digital electronic microprocessor, and will be called the "programmed digital electronic microprocessor means" or more simply "microprocessor means".

Still further the system includes some means for activating the power-passing means to apply power therethrough to the particular one device according to the power parameters. In other words, these activating means both (1) activate the power-passing means and (2) apply power through the power-passing means to the particular one device, in accordance with the parameters selected by the microprocessor means.

The foregoing may be a description or definition of the first main facet of the invention in its broadest or most general form. Even in this broad form, however, this first aspect of the invention can be seen to resolve the problems described in the preceding section of this document.

More specifically, this first broad form of the invention provides a single, universal power supply that can be used to supply power to virtually any portable electronic device of suitable power demand, whether in a multiuser facility or in some private context—such as a home or personal car. This universal supply thereby introduces important economies of manufacture, inventory and distribution, together with some provision for safety against power misapplication.

Although this first major aspect of the invention even in this broad form thus resolves prior-art problems, nevertheless this aspect of the invention is preferably practiced with certain additional features or characteristics that enhance enjoyment of the advantages of the invention. For example, preferably the system further includes at least one electrical cable, with termination that is standard for connection to any of such electronic devices of the multiplicity.

This at least one cable includes conductors that serve as part of the power-passing and information-accepting means. In this preferred form, the electronic device provides the identification information into the information-accepting means of the cable.

In one such preferred arrangement, it is still further preferable that the conductors include:

- at least one conductor that serves as part of the power-passing means but not the information-accepting means; and
- at least one other conductor that serves as part of the information-accepting means but not the power-passing means.

In an alternative such preferred arrangement, however, it is preferable that the conductors serving as part of the information-accepting means are the identical conductors that serve as part of the power-passing means.

Reverting to the first major aspect of the invention, another preferable feature—particularly in a case where the system is for use in conjunction with any of a multiplicity of cables that are respectively associated with such electronic devices of the multiplicity—is provision of at least one electrical connector receptacle, with terminal configuration that is standard for connection to any of such multiplicity of cables. In this arrangement the at least one connector receptacle includes terminals that serve as part of the power-passing and information-accepting means; and the associated cable and electronic device in conjunction provide the identification information into the information-accepting means of the connector receptacle.

Another preferable feature for inclusion in the system is a tabulation of identification information with corresponding power parameters, for each of a multiplicity of electronic devices, held in association with the microprocessor means. For a class of electronic devices that are not acceptable for use with—or whose identification information is not recognized by—the system, the tabulation preferably comprises corresponding power parameters that encompass passing no power to any device of the class of electronic devices.

Preferably the power-passing and information-accepting means are connected by a detachable connector to at least one of (1) the microprocessor means and (2) one of such electronic devices. For some purposes the system of the first main facet of the invention also preferably includes the source of electrical power.

It is also preferable, as to the first major aspect of the invention, that the power-passing and information-accepting means include an electrical cable having a termination that is standard for connection to any of such electronic devices of the multiplicity. It is also preferable that the parameters for each of such devices comprise at least one parameter selected from the group consisting of supply voltage, supply impedance, and supplied current. In regard to a system according to the latter preference, it is particularly desirable that the parameters for each of such devices include at least supply voltage and supplied current.

it is also preferred that the identification information include at least one of the power parameters. (In one form of this feature, the identification may include a device code or device-category code for use in a lookup table that has all the power parameters, and the at least one power parameter is used as redundant cross-checking information to validate that the information coming from the device-associated memory chip is valid. In another form of this feature, the identification information simply includes the power parameters as such, so that no lookup function is needed.)

In preferred embodiments of a second of its principal facets or aspects, the invention is a power-supply connection system for providing electrical power from a source of electrical power in a facility, to operate a plurality of electronic devices. Each such device is one of a multiplicity of electronic devices that are compatible with the facility.

Here the system includes power-receiving means as before. This system also has some means, including a plurality of connection ports, for passing electrical power to a plurality of any of such compatible electronic devices, substantially concurrently; as will understood these "power-passing means" are related to the power-passing means of the first aspect of the invention but with the difference of being configured for plural operation.

A preferred embodiment of this second main facet of the invention also includes some means, associated with the power-passing means, for accepting, at any of the plurality of ports, electronic-device identification information from any particular one of such electronic devices. These information-accepting means as will be understood are, analogously, related to the like-named means of the first main facet of the invention.

Also included in preferred embodiments of this second main aspect of the invention are programmed digital electronic microprocessor means for using the identification information to select power parameters, for passage of power from the power-receiving means and through the power-passing means to each particular one device. In addition such embodiments also include some means for activating the power-passing means to apply power therethrough to any of such compatible electronic devices, substantially concurrently, according to their power parameters respectively.

The foregoing may represent a definition or description of the second principal aspect or facet of the invention in its most broad or general form; however, as before the second main facet of the invention even in this very broad form may be seen to resolve difficult problems of the prior art. Specifically this general form of the second primary aspect of the invention solves the particularly difficult problems of supplying electrical power expeditiously and safely to plural or multiple users' devices concurrently.

Nevertheless as before some additional features or characteristics are preferable. For example it is preferred that the system include some means, controlled by the microprocessor means, for alerting personnel of such facility in event identification information from an incompatible electronic device is received.

In preferred embodiments of a third main aspect or facet, the invention is a power cable for use in connecting a particular electronic device to an electrical power-supply system in a facility—for passage of electrical power from the system to the device. The cable includes a first electrical connector, at one end of the cable, for connection to the electronic device; and a second electrical connector, at another end of the cable, having terminals for connection to the power-supply system.

In addition the cable includes a memory device in one of the connectors. The device is interconnected with at least one of the terminals, for connection to the power-supply system for identifying the electronic device to the power-supply system through the terminals.

The preceding two paragraphs may constitute a description or definition of the third facet of the invention in its broadest or most general form, but again can be seen to resolve important prior-art problems. In particular this facet of the invention provides a component whose use facilitates and enhances application of the insights or principles of the invention to the task of interconnecting electrical devices to power-supplying systems according to either or both of the first two aspects of the invention.

As will be understood, millions of such electrical devices already have been manufactured and exist, without any associated memory chip as taught by the invention. Some of these preexisting devices are relatively very expensive—so much so that it would be uneconomic to discard them in favor of newly manufactured devices having such an associated chip.

The cable of this third aspect of the invention makes the desired interconnection possible at only relatively minor expense. That expense is, namely, the cost of a cable that may be standard in every way except for (1) inclusion of a chip whose contained identification information matches the power requirements of the device for which it is purchased, and optionally also (2) some label, color-coding, cable imprinting or the like that identifies the electrical device or devices with which it should be used.

In addition if desired the device-end connector of the cable may be configured for the particular device or category of devices, so as to preclude or deter misconnection of a cable for one electrical device, or device category, to some other device. At any rate, as with the first two main aspects of the invention preferably this third facet is practiced in conjunction with further features to optimize its benefits.

For example it is preferred that the memory device identify the electronic device for validation of compatibility of the electronic device with the facility. It is also preferred, that the memory device be in the second electrical connector, as this arrangement in some cases may avoid including an additional conductor along the length of the cable. For now the memory device is best a Dallas® DS 2400, 2401 or 2502; any later refinements—or substantial equivalents—may be equally or more desirable. As another example, it is preferred that the memory device be a ROM chip, and a two-pin device.

Now I shall turn to the special cases mentioned earlier. As discussed below, they provide five additional main aspects of the invention, here identified as the fourth through eighth major facets or aspects of the invention.

The fourth aspect of the invention is somewhat related to the first, but here involves use of a power adapter rather than a cable that might be completely passive. More specifically, in preferred embodiments of this fourth facet, the invention is a power-supply connection system for providing electrical power, from a source of electrical power, to operate any of a multiplicity of electronic devices, at least one of which electronic devices has an associated power adapter.

This system includes means for receiving electrical power from such a source, and means for passing electrical power to such a power adapter that is associated with any of such electronic devices. The system also includes automatic means for automatically accepting electronic-device identification information for a particular device which is associated with that particular one power adapter.

These automatic accepting means are associated with the power-passing means. The accepting means accept the identification information from or through any particular one of such power adapters respectively.

Furthermore the system includes programmed digital electronic microprocessor means for using the identification information to select power parameters, for passage of power from the power-receiving means and through the power-passing means to the particular one device-associated power adapter.

Additionally, included are some means for activating the power-passing means to apply power therethrough to the particular one power adapter according to the power parameters.

This aspect of the invention provides benefits related to those described earlier for the first aspect. Those benefits are enhanced, however, by the added advantages of a power-adapter-based system—discussed earlier in the informal introduction. Of course I also prefer to use this fourth aspect of the invention in conjunction with certain added features or characteristics which will be clear from the further discussion that follows.

The fifth primary facet of the invention is related to the above-discussed second aspect, but once again focuses on use of a power adapter, rather than use of a cable that might be entirely passive. A preferred embodiment of the invention in its fifth main facet is a power-supply connection system for providing electrical power from a source of electrical power in a facility, to operate a plurality of electronic devices. Each such device is one of a multiplicity of electronic devices that have associated power adapters which are compatible with the facility—"compatible" being defined as discussed earlier. This system includes some means for receiving electrical power from such a source.

The system also includes automatic means, including a plurality of connection ports, for automatically passing electrical power to a plurality of any of such compatible power adapters respectively, substantially concurrently. In addition the system includes some means, associated with the power-passing means, for accepting, from any particular one of such power adapters at any of the plurality of ports, electronic-device identification information for a particular one device associated with that particular one power adapter.

Further included are programmed digital electronic microprocessor means for using said identification information. These means use the identification information to select power parameters, for passage of power from the power-receiving means and through the power-passing means to each particular one power adapter for its associated device.

A preferred system according to the fifth main aspect of the invention also includes some means for activating the power-passing means to apply power therethrough. The power thereby passes to any of such compatible power adapters for the associated electronic devices, substantially concurrently, according to their power parameters respectively. This aspect of the invention too has associated preferences which will optimize the enjoyment of its benefits; these preferences will become clear shortly.

A sixth major independent facet of the invention is related to the third, but here again particularly focuses upon use of a power adapter. In a preferred embodiment according to this sixth facet, the invention itself is a power adapter.

This power adapter is for use in connecting a particular electronic device to an electrical power-supply system in a facility—for passage of electrical power from the system to the device through the adapter. The power adapter includes a first electrical connector for connection to the electronic device, and a second electrical connector having terminals for connection to the power-supply system.

The power adapter also includes some means for receiving electrical power at the second electrical connector and deriving therefrom electrical power in a different form. This reformed power is for provision to the electronic device at the first electrical connector.

Finally the power adapter of this sixth major independent facet of the invention includes a memory unit interconnected with at least one of the terminals, for connection to the power-supply system. This memory unit is for identifying the electronic device to the power-supply system through the at least one terminal.

This power adapter of the sixth aspect of my invention is advantageous in that it enables enjoyment of the benefits described above for the fourth and fifth aspects of the invention. Several preferred details of features and characteristics for this sixth aspect of the invention will appear from the remainder of this document.

A seventh major independent facet of the invention is disclosed in my previously mentioned patent. This aspect of the invention addresses placement of a memory unit in the electronic device itself, rather than in a power adapter or cable.

In preferred embodiments of its seventh aspect, the invention is an electronic device, for use with an electrical power-supply system. More specifically it is for use with an electrical power-supply system which supplies power to any of a multiplicity of electronic devices, in response to received identification information for each of the supplied devices.

The identification information is for use in determining power parameters for each of the devices respectively. The electronic device includes at least one main chassis.

This electronic device also includes identifying means for providing identification information to the system, for identifying the device to the system. In addition the device has connection means for receiving power from the system and transmitting identification information from the identifying means to the system.

The identification information identifies the device to the system, through the connection means. Numerous preferences will be seen in the following discussion.

An eighth major facet of the invention is closely related to the seventh aspect discussed above, but includes several of the associated preferences. Thus preferably the identifying means include a memory unit held substantially at or within the main chassis, for providing identification information to the system.

Also preferably the identification information identifies the device to the system for validation of compatibility of the device with the system, and for establishing necessary power parameters for the device. These parameters include supply voltage, supply impedance, and supplied current—or combinations of these.

Furthermore it is preferred that the memory unit be a programmed ROM chip. More specifically I prefer that it be a memory chip in the Dallas® line, ideally model DS 2400, 2401 or 2402, or later refinements if any, and substantial equivalents if any.

The device itself is preferably for use in performing a useful function such as, but not limited to, computing, communicating, illuminating, calculating, displaying, examining, recording, reproducing, printing, fastening or controlling. It preferably includes one or more operating electronic memory modules used directly in and as part of such a useful function.

The identifying means, however, preferably include a memory unit that is distinct from every operating electronic memory module of the device. Those skilled in the art will is appreciate that this is a more practical, simple and economical method than attempting to read the main memory modules of the device. Such attempts in general would require powering up the entire unit—for the purpose of determining whether power can be supplied to the unit!—which appears somewhat impractical.

In purest principle it is true that the interrogating power from the power-supply system might be used to power up a ROM that is also used in operation of the device for its useful function, if the electronic device were specifically designed to operate thus. Such a special design, however, would have the drawback of tending to expose the contents of that ROM at the power connections, which in general is a relatively undesirable operating characteristic for a function ROM used in an electronic device. Further specific design features in turn would have to be included to overcome this drawback, and the only perceptible motivation for doing so would be to circumvent the foregoing statement of preference for a "distinct" memory unit—and corresponding provisions in certain of the appended claims. Hence this type of roundabout design may be regarded as the equivalent of employing a memory unit that is distinct from every operating memory module used in the useful function of the device.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

Figure 1:
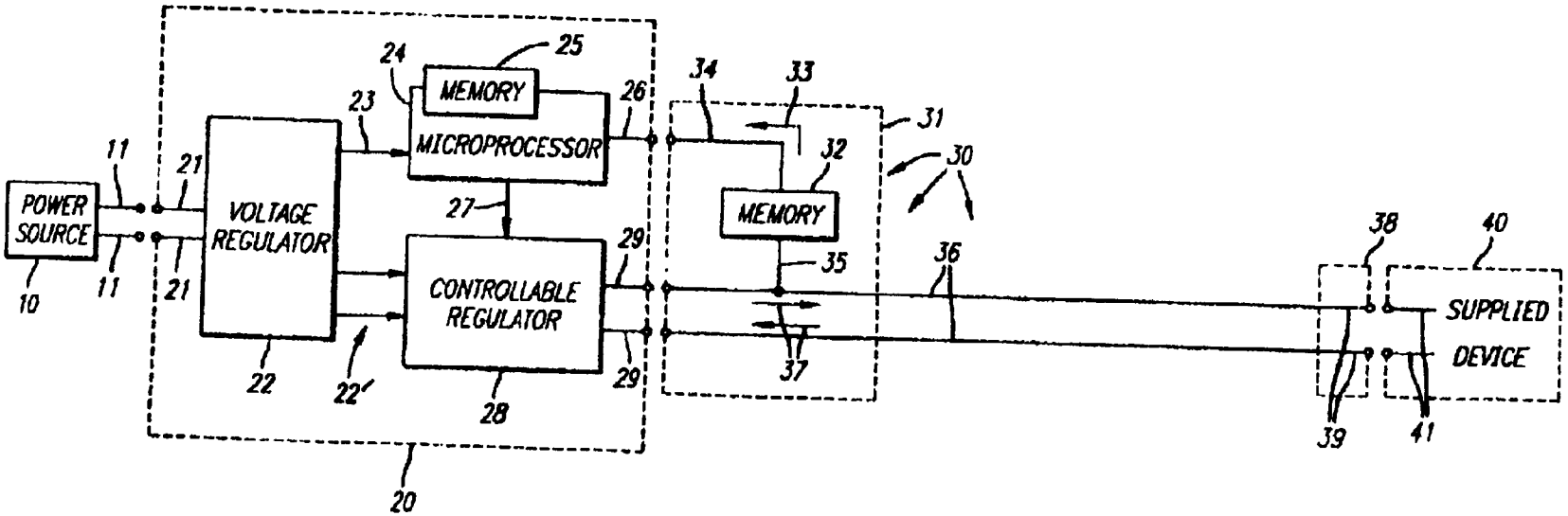
FIG. 1 is a block diagram of one preferred embodiment of a power-supply system according to the first or second main facet or aspect of the invention, together with a preferred embodiment of one form of cable according to the third main aspect or facet.

As shown in FIG. 1, electrical power from a source 10 is provided through a power-supply system 20 of the invention, and through a cable 30 of the invention, to an electrical device 40. The supplied device 40 is most typically but not necessarily a portable electronic device.

The supply system 20 receives power from the source 10 through receiving means that generally include a pair of leads/terminals 11 of the source and 21 of the supply system. In the arrangement shown, terminals may be needed because the source 10 and supply system 20 are separate or separately packaged; if instead the source 10 were encompassed and packaged within the system 20, then naturally the terminals could be omitted and the leads 11, 21 consolidated.

Within the supply system 20 a first voltage regulator 22 takes power from the input leads 21 and produces at its outputs 221, 23 stabilized voltage. Voltage at one of those outputs 23 is applied to power a digital electronic microprocessor 23 that includes or is associated with a preferably reprogrammable memory 25.

Through information-accepting means that include terminals/leads 26 of the supply system and 34 of the attached cable, the microprocessor 24 also receives identification information 33 about the device 40. The microprocessor responds by developing and applying a signal 27 to activate and control another, controllable regulator 28 within the supply system 20. (Any suitable single-line, multiline, digital or analog signal 27 may be used.)

The microprocessor is programmed to develop the signal 27 based upon use of the externally supplied information 33 in conjunction with information stored in the microprocessor-associated memory 25. More specifically, the microprocessor performs these tasks in such a way that the controllable regulator 28 supplies power at a voltage, current, etc. which are appropriate to the combination of (1) the supplied device 40 and (2) the source 10, as well as (3) a facility or other environment for which the system 20 has been prepared.

Output power from the controllable regulator is impressed upon power-passing means that include output leads/terminals 29 of the supply system. The power-passing means also include components of the cable 30, when connected to those output terminals 29, for carrying power 37 to the supplied device 40.

The cable 30 includes—at its end proximate to the supply system 20—a connector 31 whose three leads/terminals 34, 36 are respectively configured to mate with the previously mentioned three information and power leads/terminals 26, 29 of the supply system. The external configuration of this near-end connector 31 accordingly should be standard for all types of cable 30, except that—as will be seen shortly—some types of cable 30 require only two connections, in which case no separate information terminal need be included.

For the particular type of cable 30 illustrated in FIG. 1, the near-end connector 31 houses a memory 32, one of whose terminals is connected to the independent information terminal/lead 34 of the connector 31. The other terminal 35 of the memory 32 is connected to one of the power terminals/leads 36, and thereby to the mating terminal/lead 29 in the supply system 20. One mating set of terminals/loads 36, 29 thus serves as a common connection for both the information-accepting and power-supplying function of the system and cable.

Through these means the memory 32 in the near-end cable connector 31 supplies the previously mentioned external information 33. The information is transmitted by passage of electrical signals via the information terminals/leads 34, 26 (and one set of power terminals/leads 36, 29) to the microprocessor 24.

Within the near-end connector 31 typically there is an internal housing that contains the memory 32. The gross physical form of this internal housing—and thus of the interior as well as the exterior of the near-end connector may be substantially standard.

The information held within the memory, however, is specific to the device 40 which power is to be supplied, or at least to a category of such devices. The memory 32 may be a ROM, PROM (one-time-writable ROM), EPROM, EEPROM, RAM etc. whichever may be best suited for the logistics of preparing a number of memory units 32 to represent some class or category of electronic devices 40 to supply systems 20.

In the marketplace, as will be understood, some devices 40 are vastly more numerous than others. Hence some types of memories 32—depending on relative economy of scale etc. may be preferable for some devices 40, and other very different types may be preferable for other devices 40.

Issuing from the near-end connector 31 is the cable 30 proper, which is to say two elongated power-carrying leads 36 terminating in a far-end connector 30 with two power-carrying terminals 39. This far-end connector 30 and its terminals—like the information held in the memory 32, generally speaking—are specific to devices 40 of a particular type (or category of types), to which power is to be supplied; accordingly the connector 38 and terminal 39 can be configured or shape-encoded to permit connection only with devices 40 of the intended mating type or category.

As evaluated from the perspective of the supplied device 40, the entire power-supply system 20 and cable 30 engage and function as if they were a completely dedicated or specific supply arrangement for the particular device 40. Accordingly the operating components (not shown) of the device 40 are simply connected—or remain connected—in conventional fashion, without need for any special provisions on account of the power-supply system 20 and cable 30, to power-input leads 41 within the device 40.

The FIG. 1 embodiment is advantageous for (1) its relative economy, in that placement of the memory 32 in the near-end connector 31 obviates need for running the third lead 34 the length of the cable; (2) its relative simplicity in that the memory 32 has its own terminal/lead 34 separate from the power terminals/leads 36 and so requires no added measures for protecting the memory 32 against or extracting its information signal 33 from the power 37; and (3) the absence of any requirement for retrofitting the supplied device 40 with internal memory to supply the needed identification information 33.

On the other hand, this embodiment has cost drawbacks in that (1) the third terminal 34 introduces some added cost, (2) elements in both—rather than only one—of the connectors 31, 38 must be specific to the supplied device 40, and (3) for a new supplied device 40, building the cable 30 with provision for a memory unit 32, and associating the correct memory unit 32 with each cable 30, is more expensive than building the memory-unit 32 function directly into the new device 40 as part of its manufacture. People skilled in this field will understand that these recited advantages and drawbacks are simply tradeoffs to be managed in the usual engineering fashion for each subgrouping of supply systems 20, cables 30 and devices 40 in the marketplace.

Figure 2:
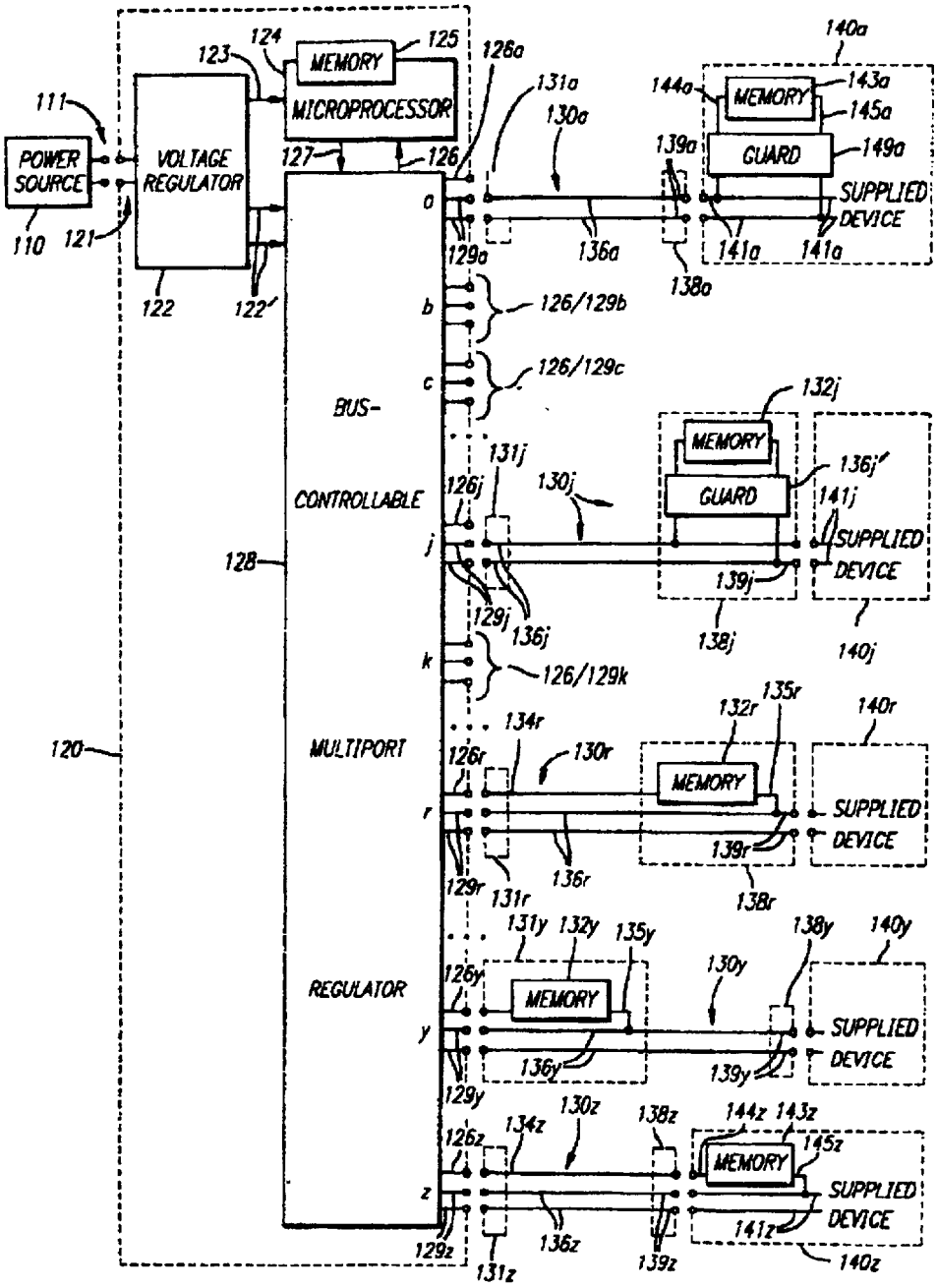
FIG. 2 is a like diagram of a system that is one preferred embodiment particularly according to the second main facet of the invention, together with several forms of cable that are preferred embodiments according to the third main aspect.

The FIG. 2 system is capable of serving only a single device as in FIG. 1—and also is capable of supplying power to numerous devices 140a–140z, when present, concurrently. As symbolized in FIG. 2 by absence of cables and supplied devices at some representative ports b, c, k, the system can operate properly with cables and devices attached at all, any, or none of its ports a–z.

The source 110, first regulator 122 and microprocessor-associated memory 125, and each of numerous three-terminal ports a–z are generally similar to the corresponding elements 10, 22, 25 and 26/29 of FIG. 1. A controllable multiport regulator 128 for use in the FIG. 2 system might also be simply an aggregation of individual regulators 28 (FIG. 1), each with its own separate control path (I.e. lead, wire pair, bus etc.) 27 from the microprocessor.

In the interest of economy, however, the regulator 128 instead may preferably be constructed to use as many as possible of its components in common for the ports a–z. For example the microprocessor may have a single identification-information-accepting path 126 from the regulator 128, and a single control path 127 to the regulator 128.

In this latter case an electrical bus system within the regulator 128 may route identification information from the individual ports a–z (for instance, from any of the individual information terminals 126a–126z) to the microprocessor's single information path 126. Such a bus system also may route activation and power-specification signals from the microprocessor's single control path 127 to individual modules (not illustrated), within the regulator 128, feeding the individual power terminals 129a–129z.

As those skilled in the art of electronic design will understand, such a bus-controllable arrangement requires a conventional addressing subsystem, guided by the microprocessor 124 to direct the passage of information and control signals (and if desired even power) along common bus elements in an orderly, mutually noninterfering way. Accordingly the microprocessor 124 programing in the FIG. 2 system, while encompassing the basic functions of the processor 24 in the elemental FIG. 1 system, also includes timesharing and addressing provisions necessary to such orderly interfacing with the controllable regulator.

Each of the FIG. 2 ports a–z is a three-terminal set, to accommodate three-terminal cable types including the cable 30 (FIG. 1). For reference purposes this is illustrated at port y of FIG. 2, where the cable 130y and supplied device 140y are identical to the cable 30 and device 40 in FIG. 1.

Some manufacturers of cables and/or devices, however, may prefer to practice forms of my invention in which only two connections are made between the cable and supply system. In such forms of the invention, identification information from a memory 143a, 132j within the supplied device 140a or cable 130j is read into the microprocessor 124 via the power leads 129a, 129j—using various provisions that will be discussed later in this document.

As will be understood such information is accepted by the processor 124 while no power is standing on the power leads 129a, 129j; and after supply of power along those leads 129a, 129j is initiated, no further information transfer is needed. Therefore no special provision is needed for concurrent sharing of those power leads by information and power.

What is needed in some systems, however, is protection of the memory 143a, 132j against the voltage at which power is provided to the supplied device 140a, 140j. Whether any given system requires such protection may depend on the magnitude and polarity, and possibly waveform, of the voltage.

Thus typical memory devices 143a, 132j are intrinsically capable of standing off—and in some commercial packages may be provided with internal guarding against—relatively modest supplied voltage, as for example ±3 Vdc. Such devices may be damaged upon application of typical battery-recharger input voltages such as for example 110 to 240 Vac.

In this family of cables and supplied devices according to the invention, each memory 143a, 132j is specifically associated—by definition, for present purposes—with a known voltage specification. It is therefore straightforward to determine for each manufacturing project whether a discrete guard element 149a, 136j' need be interposed to protect the respective memory chip 143a, 132j.

The supplied device 140a illustrated at the first port a of the FIG. 2 supply system is taken to be a device of new manufacture with a built-in memory 143a, according to the invention. In such situations, incorporating provision for the memory 143a into initial manufacture of the device 140a is especially inexpensive; likewise incorporating provision for a voltage-guarding component 149a, if needed, is inexpensive.

Incorporating such manufacturing provisions is cost effective; in particular they enable use of the most-economical and simplest possible cable 130a—completely passive and with only two conductors 136a. Incorporation of such provisions is even more attractive for a low-voltage device in which the guard element 149a may be omitted.

On the other hand, as illustrated at the last port z in FIG. 2, also within the scope of my invention is building of a memory unit 143z into a newly manufactured device 140z, and interconnection of the device 140z with the supply system 120 through a three-wire connector 144z–139z and cable 130z. This configuration may be reasonably economical, particularly e.g. for a device 140z which operates on relatively high voltage and for which a relatively short cable 130z is adequate.

The supplied device 140j illustrated at the second occupied port j, by contrast, is taken to be an already-existing device—lacking a built-in identification-information memory according to the invention. To obtain economies associated with having to make only one connector 138j specific to the supplied device 140j, the memory 132j with its device-specific contents is housed within the far-end connector 138j—that is to say, the connector which must be mechanically configured to mate with the device connector 141j anyway.

To obtain further economies associated with a two-conductor cable 130j, the memory 132j is connected across the power leads/terminals 136j/139j. This connection point is just across the supplied-device power-input connector 139j/141j from the port-a position (within the supplied device 140j) just discussed, and so is electrically equivalent—but confers the major economy of avoiding a retrofit of the supplied device 140.

As in the port-a system, within the general port-j configuration the memory 132j should be protected 136j' against the power applied to the power terminals/leads 136j/139j for relatively high-voltage devices 140j. For economy's sake such protection may be better omitted for relatively low-voltage devices.

In event the two-conductor configurations illustrated at ports a and j are regarded as sufficiently attractive (for their particular simplicities and economies) to become standard, then all the ports a–z may be made two-terminal ports by elimination of the terminals 126a–126z—as may the analogous port in the FIG. 1 system by omission of the separate information terminal 26. In that event the necessary information-signal connections may be made, before application of power, through the power ports 129a–129z, 129 as will be described shortly.

Figure 3:
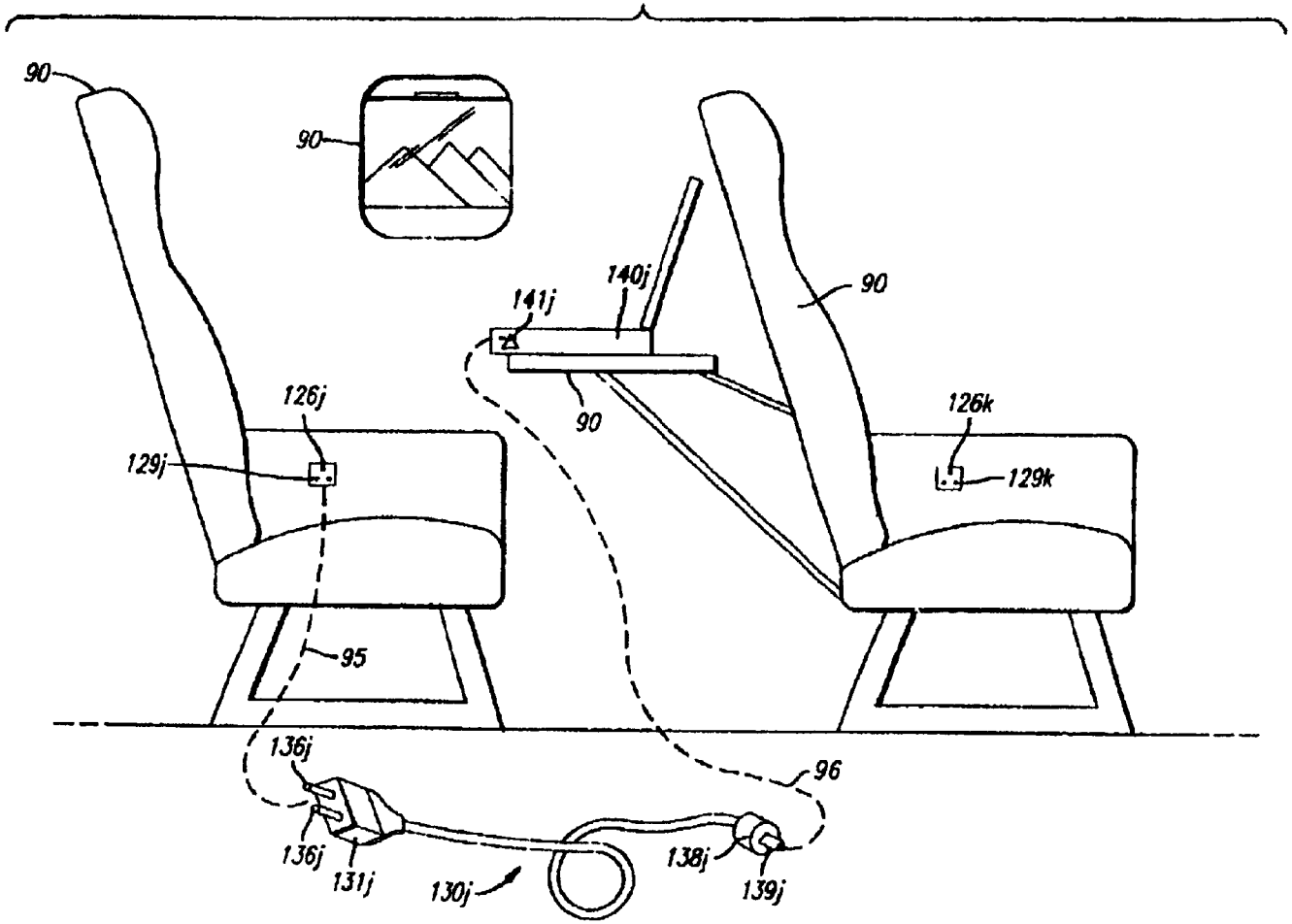
FIG. 3 is an isometric or perspective drawing of a cable according to the third main aspect of the invention, very schematically shown ready for use in a representative multiuser facility.

The cable 130j shown at the second occupied port j in FIG. 2 is also represented mechanically in FIG. 3, but with somewhat schematic representations of a facility, some supply-system elements, the supplied device 140j, and interconnections. This drawing includes conventional passenger-accommodating provisions 90 of an aircraft, a conventional or other electricity-using device 140j such as a so-called "notebook" computer ready for use within such a mobile facility, and two representative conveniently located ports 126j/129j, 126k/129k of a supply system.

Other FIG. 2 elements such as the power source 110, first regulator 122, processor 124 and associated memory 125, and most internal parts of the multiport regulator 128 may be centrally located with respect to the aircraft or other facility, and are not shown in FIG. 3. Wiring connections from the centrally disposed multiport regulator 128 to the individual user sites and corresponding ports 126j/129j, 126k/129k etc. are distributed throughout the passenger accommodations, but most typically—for reasons of esthetics, safety, and equipment protection—along paths that are concealed, and also not shown in FIG. 3.

In FIG. 3 as in FIG. 2 the near-end connector 131j is shown as a two-terminal unit, but ready for engagement 95 with the three-terminal port 126j/129j of the supply system. The near-end connector housing 131j nevertheless is advantageously configured for mating 95 of its two terminals 136j with exclusively the two power terminals 129j of the supply-system port.

As will be explained later, the two-terminal connector 131j may be engaged in either of two opposite orientations with the port terminals 129j. The far-end connector 138j and particularly its terminals 139j are mechanically configured—as symbolized by a triangular-section element (FIG. 3)—for engagement 96 with, exclusively, power-input terminals 141j of a device 140j whose power specifications are represented by the memory inside the housing 138j.

Since the memory 132j (FIG. 2) is not actually visible within the far-end connector 138j as drawn in FIG. 3, the physical elements which do appear in this drawing may be taken equally well as representing the port-a (FIG. 2) two-conductor configuration—with memory 143a built into the supplied device 140a. By visualizing the connector 131j as having one additional terminal or pin, the reader will also find FIG. 3 to be generally representative of the three-terminal configuration illustrated at ports r, y and z, and in FIG. 1.

One configuration, at the last port z in FIG. 2, has already been introduced that represents a three-wire form of a device with built-in memory 143z, conceptually related to a corresponding two-wire form at the first port a. Analogously illustrated at the third occupied port r is a three-wire form of a cable configuration for a device without built-in memory.

In this port-r configuration, identification information is supplied from a memory 132r housed in the far-end connector 138r. This port-r three-wire cable configuration is conceptually related to the corresponding two-wire form, just discussed, at the second occupied port j.

The three-wire configuration shown at the third occupied port r is advantageous in that no voltage-guard element is needed, and may be especially desirable for some high-voltage devices—particularly devices needing only relatively short cables. Thus these advantages are analogous, in relation to the related two-wire configuration at the second occupied port j, to those offered by the three-wire built-in configuration at port z, in relation to the two-wire built-in configuration at port a.

Still another form (not illustrated) of my invention is a configuration with the memory housed in the near-end cable connector—as at port y, and as in FIG. 1—but connected across the power leads as at the first two occupied ports a, j of FIG. 2. For relatively high-voltage systems, that configuration may require guarding as 15 149a, 136j' in FIG. 2.

Although that configuration is within the scope of my invention, I regard it as relatively undesirable because it incurs the added costs of making both connectors device-specific, but without greatly redeeming itself by saving the cost of a third wire along the full cable length—since there is no third wire beyond the near-end connector. Nonetheless the configuration under discussion does have some benefit in that the near-end connector need have only two terminals rather than three (as at port y in FIG. 2).

Now in operation with respect to each generalized port "a" of the multiple ports a–z of a multiport form of my invention, the microprocessor 124 initially is quiescent 50 (FIG. 4) with respect to power application at power terminals of that port n—waiting for a connection at that port n. This initial condition of quiescence, however, is relatively active in terms of logical functions of the microprocessor, as that unit is programmed to circulate continuously through a connection-monitoring loop 50–54.

More specifically, the processor may check at intervals in the range of, for example, once each five seconds to several times each second for each of several possible connections to a memory 32, 132, 143. Thus in sequence the processor 24, 124 may:

- attempt 51 to find a memory connected to its data line 26, 126; then failing that
- attempt 52 to find a memory connected with one arbitrary selected ("forward") polarity across the power terminals 29, 129; and then failing that attempt 53 to find a memory connected with an opposite ("reverse") polarity—but across the same power terminals 29, 129.

Still failing this last possibility, with respect to port n the system returns 54 to begin the process again. The system may be programmed, however, to digress (not shown)—at any point in the process—from servicing of any particular port n to monitoring or other steps with respect to the other ports.

In event any of the tests 51–53 is positive, the system proceeds to read 55–57 the present memory 32, 132, 143 in its respective orientation. People skilled in this field will understand that as a practical matter, depending upon the protocol established for the memory units by their manufacturer(s), there may be no physical distinction between the steps of testing 51–53 for a connection and the steps 55–57 of reading signals from the memory unit; hence in this particular regard the diagram in some practical cases may be regarded as partially conceptual.

In any event the system proceeds 58 to the next firmware module 60–68, in which acceptability of the presented device 40, 140 is determined. To this end the processor first receives 60 to the identification information into a suitable intermediate storage point within the processor 24, 124 and then advances 61 to the step of seeking 62 some matching entry in a lookup table that is held in the processor-associated memory 25, 125.

If the processor fails to find 64 any such matching entry, then its sequence branches 65 to return 67 to the quiescent state. Along the way—if the system designers have chosen the option indicated in the drawing—the processor sounds and/or displays 66, to the local user and/or to centralized operators of the facility 90, an indication that an unacceptable connection has been presented to the supply system.

Such an unacceptable connection may represent a device 40, 140 which has been disqualified from use in the particular facility, or has not been submitted for preapproval, for use in the particular facility 90, or which is simply a foreign memory unit not carrying any valid device-identifying code. Alternatively such a connection may represent a paperclip or like metal object such as might be inserted by a small child—or even a deliberate bogus connection such as a jumper wire or screwdriver, as may be presented to the system from time to time by a prankster or vandal.

For a multiuser facility the optional design feature of a central alarm may be particularly appropriate to enable aircraft cabin attendants, for example, to deter any misuse of the system. In a private context, on the other hand, no alarm may be needed as each user will understand if power is not provided that the system has detected some incompatibility.

Figure 4:
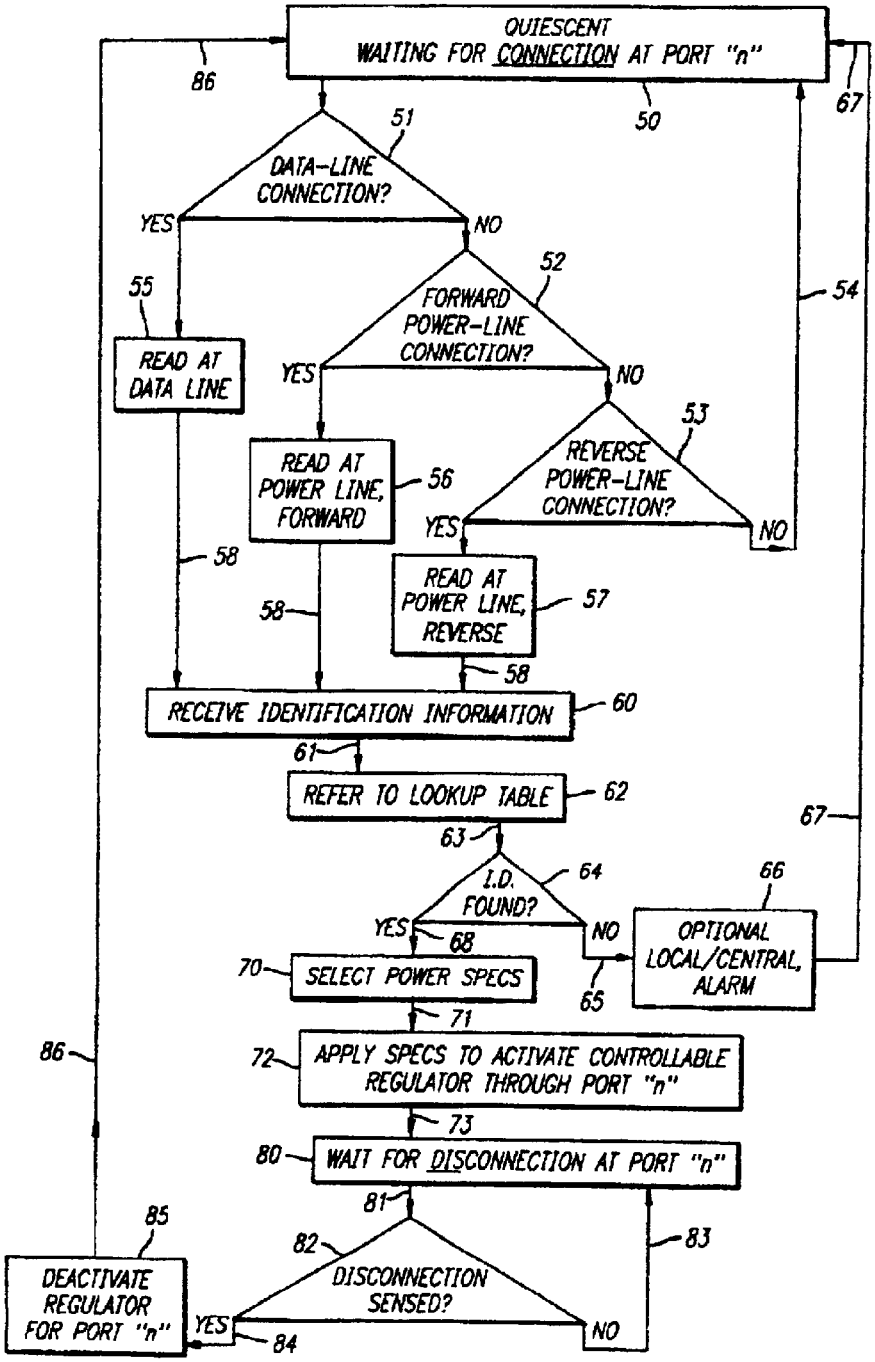
FIG. 4 is a logic-flow diagram representing operation of firmware in the FIG. 1 or FIG. 2 power-supply system to accept information from a device or device-associated memory chip and in response supply electricity to the device, if eligible.

It will be understood that merely for definiteness and simplicity has FIG. 4 been drawn as representing a system in which disqualified devices 40, 140 are simply not included in the lookup table. For at least some practical commercial systems it may be preferred to include disqualified devices 40, 140—but flagged as disqualified, so that the system alarm 66 can indicate, for the information of the prospective user or system operators, a distinction between presentation of a device that is disqualified and one that is unrecognized. In some instances the user or operators may wish to take suitable remedial action, based upon such information.

On the other hand, if the processor is able to find 64 in the lookup table 25, 125 a matching entry, then the system instead proceeds 68 to another procedural module 70–73; supplying suitable power to the presented device 40, 140. This process includes first selecting 70 suitable power specifications.

Again as a practical matter this selection step may be physically unitary with finding 64, 68 the submitted identification in the lookup table. In particular, as mentioned earlier the identification information 33 may itself include or consist of all necessary power specifications, so that the need for a lookup table may be obviated or reduced and the "selection" step 70 may simply consist of reading—and perhaps reformatting—the information from the external memory 32, 132, 143.

In any case, once the specifications are selected the system goes on 71 to apply 72 them to activate the controllable regulator 28, 128 through the pertinent port n, and then go on to module 80–86 relating to eventual disconnection of the supplied device 40, 140. In the latter module the system repetitively cycles 80–83 through testing 82 for disconnection, and failing that test then repeating the same test at frequent intervals such as, for instance, once or twice per second but when the test 82 is met, the system branches 84 to deactivate the regulator 28, 128 with respect to port n (which is to say, disconnect the power at that port), and then reset 86 to the initial quiescent state 50 for that port n.

Where a power-adapter-based system is substituted for a passive-cable-based system, with reference to a single user station, the FIG. 1 schematic may instead appear generally as shown in FIG. 4. FIG. 1 elements that are different from those in FIG. 1 but serve very generally analogous functions are shown with callouts that differ only by the insertion of a prefix "2".

As to identification of the device 240 (by way of its power adapter 231) to the system 220, the operation is closely analogous. As explained earlier, however, the overall system now has the benefits of operating with standard voltage at the terminals 226, 229 regardless of the type of device 240 that is present—and also, because a. c. voltage is in use, with more-economical power transmission to the user station.

Figure 5:
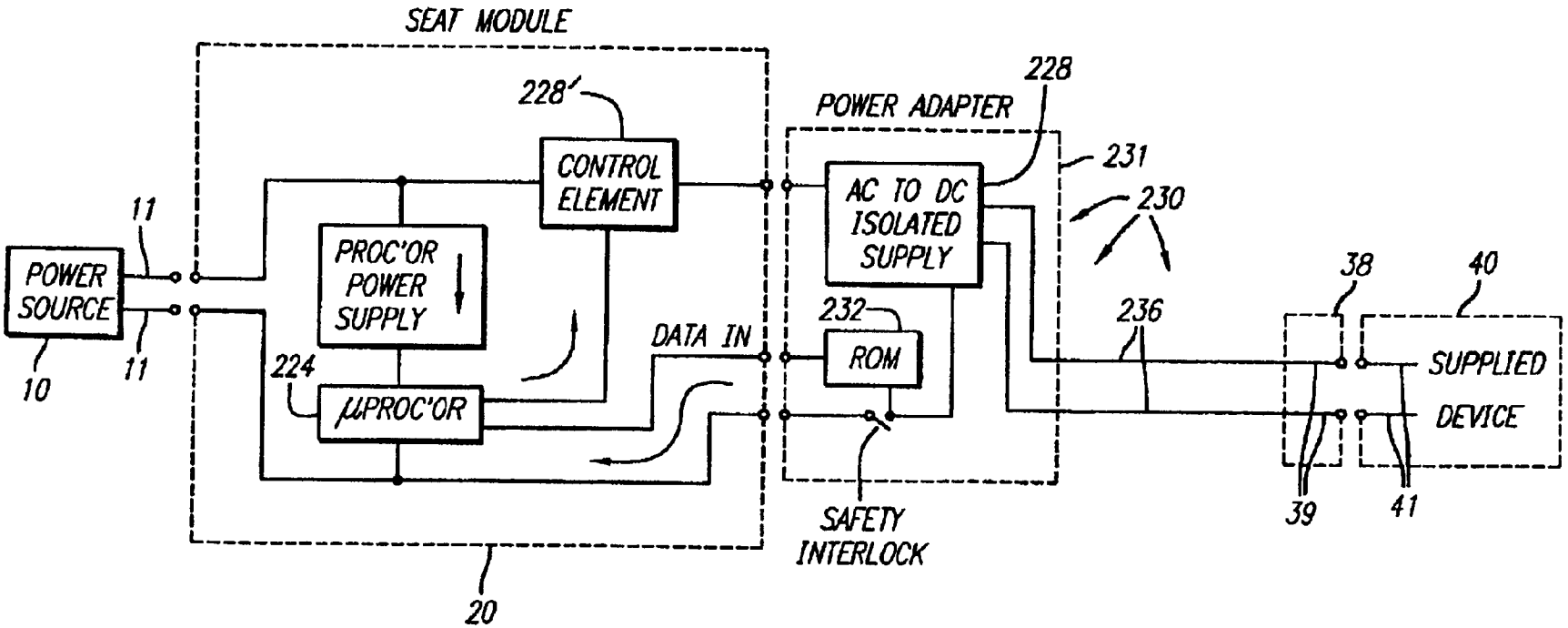
FIG. 5 is a digram like FIG. 1 but relating to a power adapter rather than a passive cable.
Figure 6:
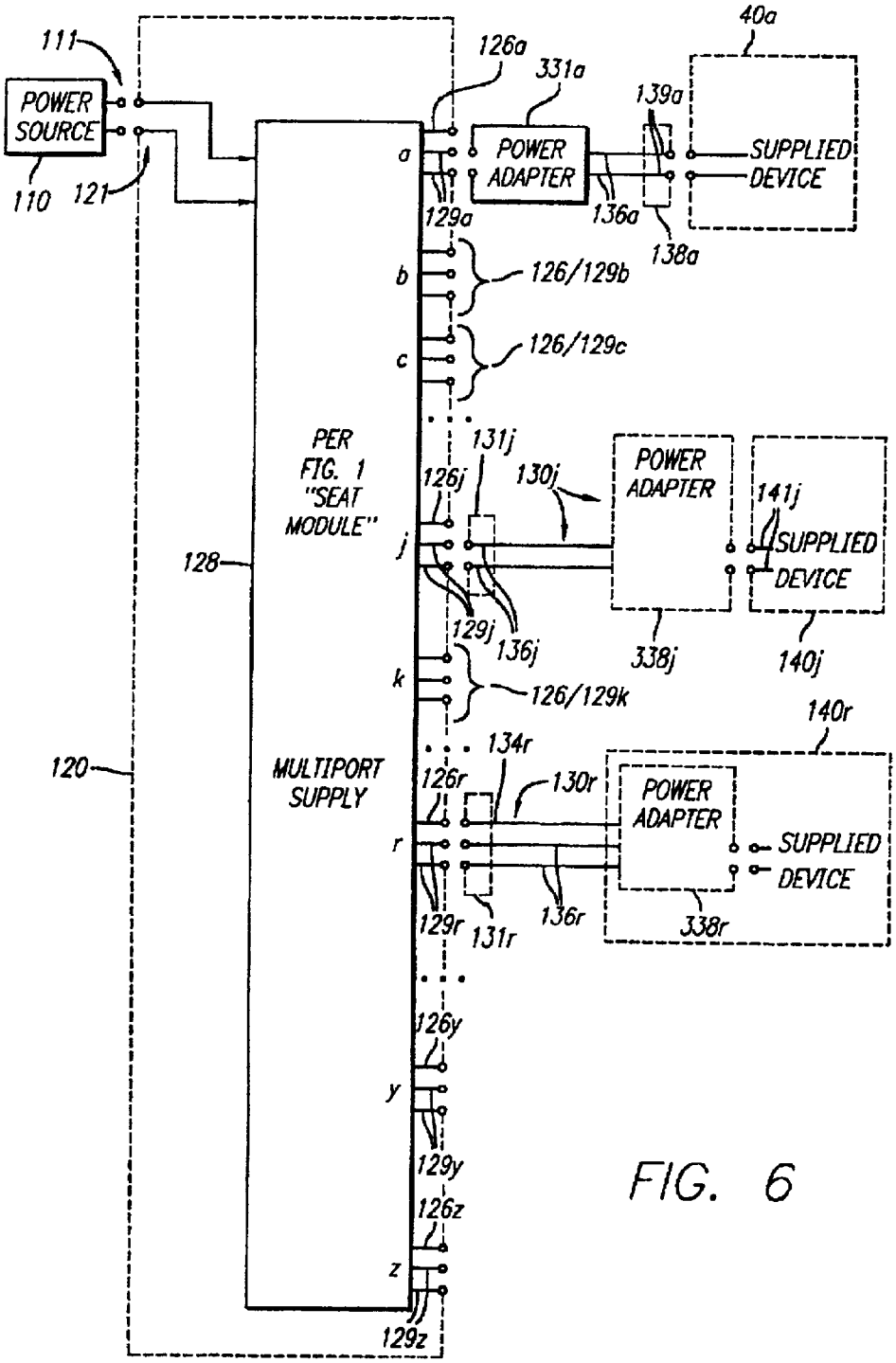
FIG. 6 is a diagram like certain portions of FIG. 2 but relating to power adapters.
Figure 7:
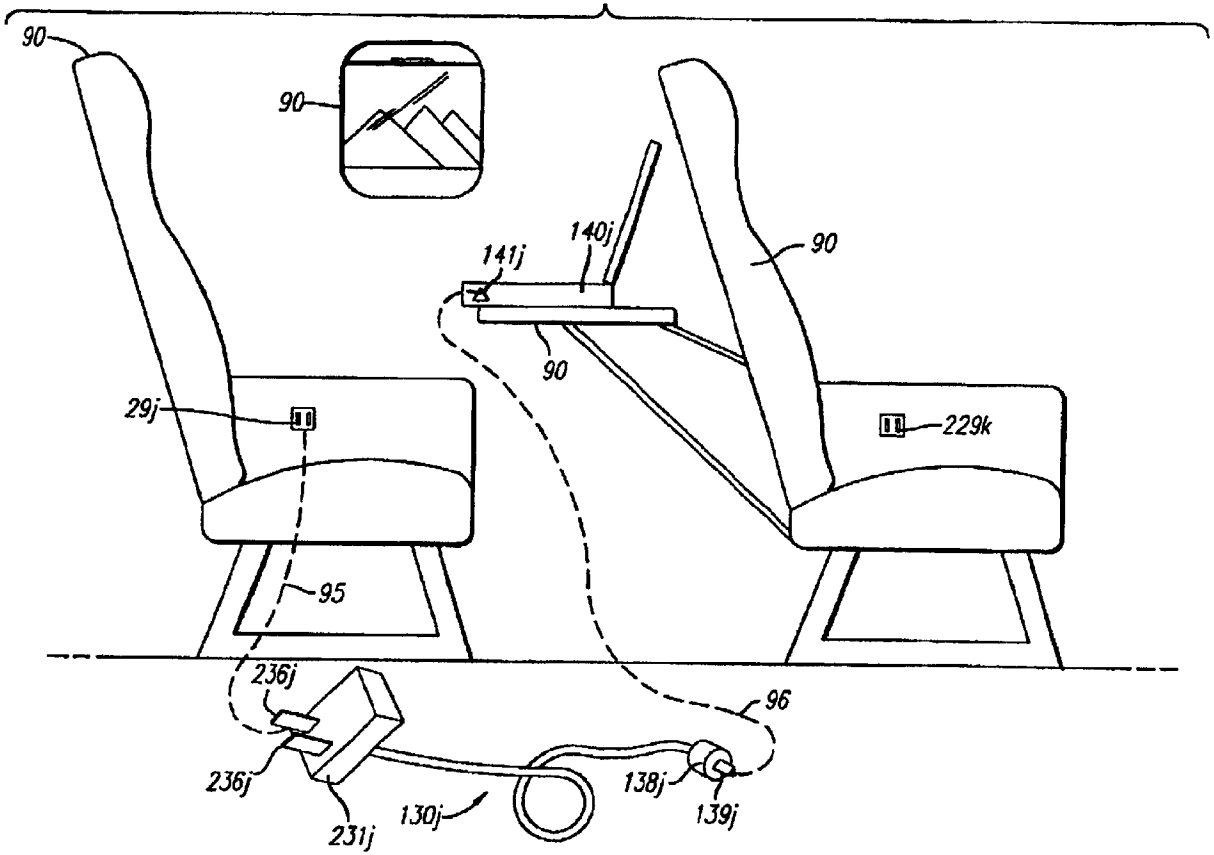
FIG. 7 is an isometric or perspective drawing like FIG. 3, but for a system that uses power adapters.

Analogously, the FIG. 2 schematic for multiple user stations may instead, for a power-adapter-based system, appear generally as shown in FIG. 5. Here the prefix is "3" instead of "2". Once again, the identification procedure is generally as before, but the overall multiple-user system now has the benefits of a single common, standard a. c. voltage for all users.

The system is advantageously programmed to monitor current drawn at each port in use, and compare the current drawn with the current-specifications portion of power specifications found earlier. The system is also advantageously programmed to deactivate the controlled regulator 28, 128 with respect to any port at which a power overload arises when or after power supply is initiated at that port. Of course an overload may be defined with respect to criteria for a facility 90, in addition to criteria selected as part of power specifications for a device 40, 140.

Some system designers may prefer to structure the supply system 20, 120 so that in use of two-terminal cables 30, 130 the contents of the memory 32, 132, 143 remain accessible to the processor 24, 124 even after power is supplied to the device 40, 140. Such operation is readily possible, though more costly, through conventional multiplexing of the identification data onto the power lines 29/36, 129/136.

The invention is readily implemented in firmware of a dedicated microprocessor within a supply-system apparatus housing 20, 120. Alternatively, however, and particularly for relatively large facilities such as a laboratory complex, hotel, convention center, ship, or large aircraft, the necessary programming and some of the connections according to my invention may instead be provided as software and controlled ports of a general-purpose computer—and thus integrated into the overall operational systems of the facility, thereby expediting any desired updating of the identification-information database 125, as well as customization of the power-supplying system to protocols, organization, security, hierarchies etc. of the facility.

Thus in some types of multiuser facilities the microprocessor 124 may be provided additional information about relevant facility status. In aircraft, for instance, which provide a passenger-amenities pod at each seat the availability of power through supply systems according to my invention may be conditioned upon use or nonuse of other elements of the pod. For example the system may, to promote safety, refuse power to a port 129/126 until some deployment of the pod itself is detected; or, to limit power at each seat, refuse power if a video display associated with the pod is also or already in use.

Some systems according to my invention, for marketing or other purposes, may be made facility-specific in different ways. For example, the device-specific memory unit 32, 132, 143 may be usable only in aircraft of a particular airline e.g., perhaps one which mails a cable 30, 130 without charge to each preferred passenger or prospect.

As to types of memory unit 32, 132, 143 for use in the cable 30, adapter 230, 330 or device 140a, 140z, 340, as suggested earlier I prefer a ROM such as the Dallas® DS 2400 or 2401 (chips in two different voltage options respectively) for supplied devices 40 etc. whose power specifications are very common. I prefer to use ROMs for such supplied devices 40 etc. because ROMs are the least expensive memory units for high-volume applications.

For devices 40 etc. whose power specifications are much less common, I prefer to use a PROM. One suitable commercially available unit is the Dallas® DS 2502, which actually is a hybrid—having one kilobyte of one-time-writable memory space or PROM in addition to the same ROM used in the DS 2401.

Use of such a programmable memory unit carries the benefit is of reducing inventory, as the unit—and even an otherwise-finished cable 30—can be programmed at a warehouse or even retail store, after preliminary distribution, to accommodate a considerable variety of supplied devices 40 etc.

An alternative for special applications is a more-powerful electronic device such as a RAM, or even a microprocessor programmed to represent or simulate a simpler memory chip (and note the earlier comment about equivalence to a distinct memory unit). For example a central or other processor (not shown) in a portable computer or other supplied device 140a, 140z may be programmed (and if need be provided with a small continuous power supply) to serve the functions of the memory unit 143a, 143z.

All such variations are within the scope of my invention. As will be understood, the foregoing disclosure is intended to be merely exemplary, not to limit the scope of the invention which is to be determined from the appended claims.

I claim:

1. A power-supply connection system for providing electrical power, from a source of electrical power, to operate any of a multiplicity of electronic devices, at least one of which electronic devices has an associated power adapter; and said system comprising:

means for receiving electrical power from such a source;

means for passing electrical power to such a power adapter that is associated with any of such electronic devices;

automatic means, associated with said power-passing means, for automatically accepting, from or through any particular one of such power adapters respectively, electronic-device identification information for a particular device which is associated with that particular one power adapter;

programmed digital electronic microprocessor means for using said identification information to select power parameters, for passage of power from the power-receiving means and through the power-passing means to said particular one device-associated power adapter; and means for activating the power-passing means to apply power therethrough to said particular one power adapter according to the power parameters.

2. The system of claim 1, for use with at least one electronic device whose associated power adapter holds a memory unit for identifying the device to the system; and wherein:

the information-accepting means receive the identification information from such memory unit held by such power adapter.

3. The system of claim 2, wherein:

said power-passing means pass a. c. power to such power adapter.

4. The system of claim 1, for use in conjunction with any of a multiplicity of power adapters that are respectively associated with such electronic devices of the multiplicity:

further comprising at least one electrical power-adapter receptacle, with terminal configuration that is standard for connection to any of such multiplicity of power adapters, the at least one power-adapted receptacle comprising terminals that serve as part of the power-passing and information-accepting means; and wherein the information-accepting means of the power-adapter receptacle receive the identification information from such power adapter and associated electronic device.

5. The system of claim 4, wherein:

the terminals serving as part of the information-accepting means are the identical terminals that serve as part of the power-passing means.

6. The system of claim 1, further comprising:

a tabulation of identification information with corresponding power parameters, for each of a multiplicity of electronic devices, held in association with the microprocessor means.

7. The system of claim 6, wherein:

for a class of electronic devices that are not acceptable for use with or whose identification information is not recognized by the system, the tabulation comprises corresponding power parameters that encompass passing no power to any device of said class of electronic devices.

8. The system of claim 7, particularly for use in environments sensitive to inadequately controlled electromagnetic-radiation emissions; and wherein:

said class of electronic devices that are not acceptable for use with, or whose identification information is not recognized by, the system comprise electronic devices that produce electromagnetic-radiation emissions that are inadequately controlled.

9. The system of claim 1, further comprising:

said source of electrical power.

10. The system of claim 1, for use in conjunction with at least one of such electronic devices, of the multiplicity, which substantially contains its associated power adapter, and wherein:

the power-passing and information-accepting means comprise an electrical cable having a termination that is standard for connection to any of such power adapters of the multiplicity.

11. The system of claim 1, wherein:

the parameters for each of such devices comprise at least one parameter selected from the group consisting of supply voltage, supply impedance, and supplied current.

12. The system of claim 1, wherein:

the parameters for each of such devices comprise at least supply voltage and supplied current.

13. The system of claim 1, wherein:

the identification information itself comprises at least one of the power parameters.

14. The system of claim 1, wherein:

the identification information itself comprises the power parameters.

15. A power-supply connection system for providing electrical power from a source of electrical power in a facility, to operate a plurality of electronic devices, each such device being one of a multiplicity of electronic devices that have associated power adapters which are compatible with the facility; said system comprising:

means for receiving electrical power from such a source;

automatic means, including a plurality of connection ports, for automatically passing electrical power to a plurality of any of such compatible power adapters respectively, substantially concurrently;

means, associated with said power-passing means, for accepting, from any particular one of such power adapters at any of the plurality of ports, electronic-device identification information for a particular one device associated with that particular one power adapter;

programmed digital electronic microprocessor means for using said identification information to select power parameters, for passage of power from the power-receiving means and through the power-passing means to each particular one power adapter for its associated device; and means for activating the power-passing means to apply power therethrough to any of such compatible power adapters for the associated electronic devices, substantially concurrently, according to their power parameters respectively.

16. The system of claim 15, for use with at least one such electronic device whose associated power adapter holds an electronic memory unit; and wherein:

the information-accepting means receive the identification information from such electronic memory unit held by such associated power adapter.

17. A power adapter for use in connecting a particular electronic device to an electrical power-supply system in a facility, for passage of electrical power from the system to the device through the adapter; said power adapter comprising:

a first electrical connector for connection to the electronic device;

a second electrical connector having terminals for connection to the power-supply system;

means for receiving electrical power at the second electrical connector and deriving therefrom electrical power in a different form for provision to the electronic device at the first electrical connector; and a memory unit interconnected with at least one of the terminals for connection to the power-supply system, for identifying the electronic device to the power-supply system through said at least one terminal.

18. The power adapter of claim 17, wherein:

the memory unit identifies the electronic device for validation of compatibility of the electronic device with the facility.

19. The power adapter of claim 17, wherein:

the memory unit is in the second electrical connector.

20. The power adapter of claim 17, wherein:

the memory unit is a memory chip selected from the group consisting of the Dallas® memory chips model DS 2400, 2401 and 2502 and later refinements if any, and substantial equivalents thereof if any.

21. The power adapter of claim 17, wherein:

the memory unit is a programmed ROM chip.

22. An electronic device for use with an electrical power-supply system which supplies power to any of a multiplicity of electronic devices, in response to received identification information for each of the supplied devices, said identification information being for use in determining power parameters for each of the devices respectively; said electronic device comprising:

at least one main chassis;

identifying means for providing identification information to the system, for identifying the device to the system; and connection means for receiving power from the system and transmitting identification information from the identifying means to the system;

wherein the identification information identifies the device to the system, through the connection means.

23. The electronic device of claim 22, wherein:

the identifying means identify the electronic device for validation of compatibility of the electronic device with the system.

24. The electronic device of claim 22, wherein:

the identifying means comprise a memory unit held substantially at or within the main chassis.

25. The electronic device of claim 24, wherein:

the identifying means comprise a memory unit held adjacent to the main chassis.

26. The electronic device of claim 25, wherein:

the memory unit is held in a power adapter adjacent to the main chassis.

27. The electronic device of claim 26, wherein:

the power adapter receives a. c. electrical power from the system and derives, from said a. c. power, electrical power in a modified form for operating the device.

28. The electronic device of claim 22, wherein:

said identification information identifies the device to the system adequately for establishing necessary power parameters for the device.

29. The electronic device of claim 28, wherein:

said parameters comprise at least one parameter selected from the group consisting of supply voltage, supply impedance, and supplied current.

30. The electronic device of claim 28, wherein:

the parameters comprise at least supply voltage and supplied current.

31. The electronic device of claim 28, wherein:

the identification information itself comprises at least one of the power parameters.

32. The electronic device of claim 28, wherein:

the identification information itself comprises the power parameters.

33. The electronic device of claim 32, wherein:

the parameters comprise at least one parameter selected from the group consisting of supply voltage, supply impedance, and supplied current.

34. The electronic device of claim 32, wherein:

the parameters comprise at least supply voltage and supplied current.

35. The electronic device of claim 22, wherein:

the identifying means comprise a memory unit that is a memory chip selected from the group consisting of the Dallas® memory chips model DS 2400, 2401 and 2502 and later refinements if any, and substantial equivalents thereof if any.

36. The electronic device of claim 22, wherein:

the identifying means comprise a memory unit that is a programmed ROM chip.

37. The electronic device of claim 22, for use in performing a useful function such as but not limited to computing, communicating, illuminating, calculating, displaying, examining, recording, reproducing, printing, fastening, or controlling:

further comprising one or more operating electronic memory modules used directly in and as part of such a useful function; and wherein the identifying means comprise a memory unit that is distinct from every operating electronic memory module of the device.

38. An electronic device for use with an electrical power-supply system which supplies any of a multiplicity of electronic devices, in response to received identification information for each of the supplied devices, said identification information being for use in determining power parameters for each of the devices respectively; said electronic device comprising:

at least one main chassis;

identifying means, comprising a memory unit held substantially at or within the main chassis, for providing identification information to the system, for identifying the devices to the system; and connection means for receiving power from the system and transmitting identification information from the identifying means to the systems; and wherein:

the identification information identifies the device to the system, through the connection means, for validation of compatibility of the electronic device with the system and for establishing necessary power parameters for the device;

said parameters comprise at least one parameter selected from the group consisting of supply voltage, supply impedance, and supplied current;

the identification information itself comprises at least one of the power parameters.

39. The device of claim 38, wherein:

the memory unit is a memory chip selected from the group consisting of the Dallas® memory chips model DS 2400, 2401 and 2502 and later refinements if any, and substantial equivalents thereof if any.

40. The device of claim 38, wherein:

the identifying means comprise a memory unit that is a programmed ROM chip.

41. The device of claim 38, for use in performing a useful function such as but not limited to computing, communicating, illuminating, calculating, displaying, examining, recording, reproducing, printing, fastening, or controlling:

further comprising one or more operating electronic memory modules used directly in and as part of such a useful function; and wherein the identifying means comprise a memory unit that is distinct from every operating electronic memory module of the device.

*42. In combination:*

*a first electrical element, which comprises a voltage source;*

*a second electrical element, which comprises an electrical device that receives voltage from the source;*

*a cable or adapter for receiving and transmitting the voltage from the source to the device; and*

*a memory unit automatically identifying one of the elements to the other element;*

*wherein the other element comprises a processor operating in response to the identifying.*

*43. The combination of claim 42, wherein:*

*the processor uses said identifying in operating the other element.*

*44. The combination of claim 42, wherein:*

*the memory unit comprises an interchangeable memory unit.*

*45. The combination of claim 42, wherein:*

*the memory unit is associated with the cable or adapter.*

*46. The combination of claim 42, wherein:*

*the memory unit comprises an interchangeable memory unit associated with the cable or adapter.*

*47. The combination of claim 42, wherein:*

*the memory unit is associated with the second electrical element.*

*48. The combination of claim 42, wherein:*

*the memory unit comprises an interchangeable memory unit associated with the second electrical element.*

*49. The combination of claim 42, for use in performing a useful function such as but not limited to computing, communicating, illuminating, calculating, displaying, examining, recording, reproducing, printing, fastening, or controlling:*

*further comprising one or more operating electronic modules used directly in and as part of such useful function; and*

*wherein the memory unit is distinct from every operating electronic module of the device.*

*50. The combination of claim 42, wherein:*

*the memory unit comprises a memory chip selected from the group consisting of the Dallas® memory chips model DS 2400, 2401 and 2502 and later refinements if any, and substantial equivalents thereof if any.*

*51. The combination of claim 42, wherein:*

*the memory unit comprises a programmed ROM chip.*

*52. The combination of claim 42, wherein:*

*the second electrical element further comprises at least one main chassis.*

*53. The combination of claim 52, wherein:*

*the memory unit is held substantially at or within the main chassis.*

*54. The combination of claim 52, wherein:*

*the memory unit is held adjacent to the main chassis.*

*55. The combination of claim 52, wherein:*

*the memory unit is held in an adapter adjacent to the main chassis.*

*56. The combination of claim 42, wherein:*

*the first element further comprises an airplane.*

*57. In combination:*

*a first electrical element, which comprises a voltage source;*

*a second electrical element, which comprises an electrical device that receives voltage from the source;*

*a cable or adapter receiving and transmitting the voltage from the source to the device; and*

*an interchangeable memory unit automatically identifying one of the elements to the other element;*

*wherein the other element comprises a processor operating in response to the identifying.*

*58. The combination of claim 57, wherein:*

*the memory unit is associated with the cable or adapter.*

*59. The combination claim 57, wherein:*

*the memory unit is associated with the second electrical element.*

*60. An identifying module for use with a first electrical element which comprises a voltage source, a second electrical element which comprises an electrical device that receives voltage from the source, and a processor that operates the first or second element; said identifying module comprising:*

*a memory unit for automatically identifying one of the elements to the other element; and*

*a cable or adapter for transmitting the identifying from the memory unit to control the processor.*

*61. The identifying module of claim 60, wherein the cable or adapter comprises:*

*conductors for receiving and transmitting the voltage from the source to the device.*

*62. An identifying module for use with a first electrical element which comprises a voltage source, a second electrical element which comprises an electrical device that receives voltage from the source, and a processor that operates the first or second element; said identifying module comprising:*

*a memory unit automatically identifying one of the elements to the other element; and*

*a cable or adapter transmitting the identifying from the memory unit to control the processor.*

*63. The identifying module of claim 62, wherein the cable or adapter comprises:*

*conductors receiving and transmitting the voltage from the source to the device.*

*64. An interconnection module for use with a first electrical element which comprises a voltage source, a second electrical element which comprises an electrical device that receives voltage from the source, a memory unit automatically identifying one of the elements to the other element, and a processor that operates the first or second element; said interconnection module comprising:*

*a cable or adapter transmitting the identifying from the memory unit to control the processor;*

*wherein the cable or adapter comprises conductors for receiving and transmitting the voltage.*

*65. The interconnection module of claim 64, in further combination with:*

*said memory unit.*

*66. The interconnection module of claim 64, in further combination with:*

*said memory unit; and*

*said first electrical element.*

*67. An electrical system for use with an interconnection module which comprises a memory unit for automatically identifying one electrical element to another electrical element, and a cable or adapter transmitting the identifying from the memory unit to a processor in the other element, said processor operating in response to the identifying, wherein the cable or adapter comprises conductors for receiving and transmitting voltage from a voltage source to the electrical device; said electrical system comprising:*

*a first electrical element which comprises the voltage source; and*

*a second electrical element which comprises the electrical device that receives the voltage from the source.*

*68. The electrical system of claim 67, in further combination with:*

*said memory unit; and*

*said cable or adapter.*

*69. An identifying module for use with a first electrical element which comprises a voltage source, and a second electrical element which comprises an electrical device that receives voltage from the source; said identifying module comprising:*

*a memory unit for automatically identifying one of the elements to the other element; and*

*a cable or adapter for transmitting the identifying from the memory unit to the other element;*

*wherein the cable or adapter comprises conductors for receiving and transmitting the voltage from the source to the device.*

*70. An identifying module for use with a first electrical element which comprises a voltage source, and a second electrical element which comprises an electrical device that receives voltage from the source; said identifying module comprising:*

*a memory unit automatically identifying one of the elements to the other element; and*

*a cable or adapter transmitting the identifying from the memory unit to the other element;*

*wherein the cable or adapter comprises conductors receiving and transmitting the voltage.*

* * * * *